Patented Nov. 10, 1953

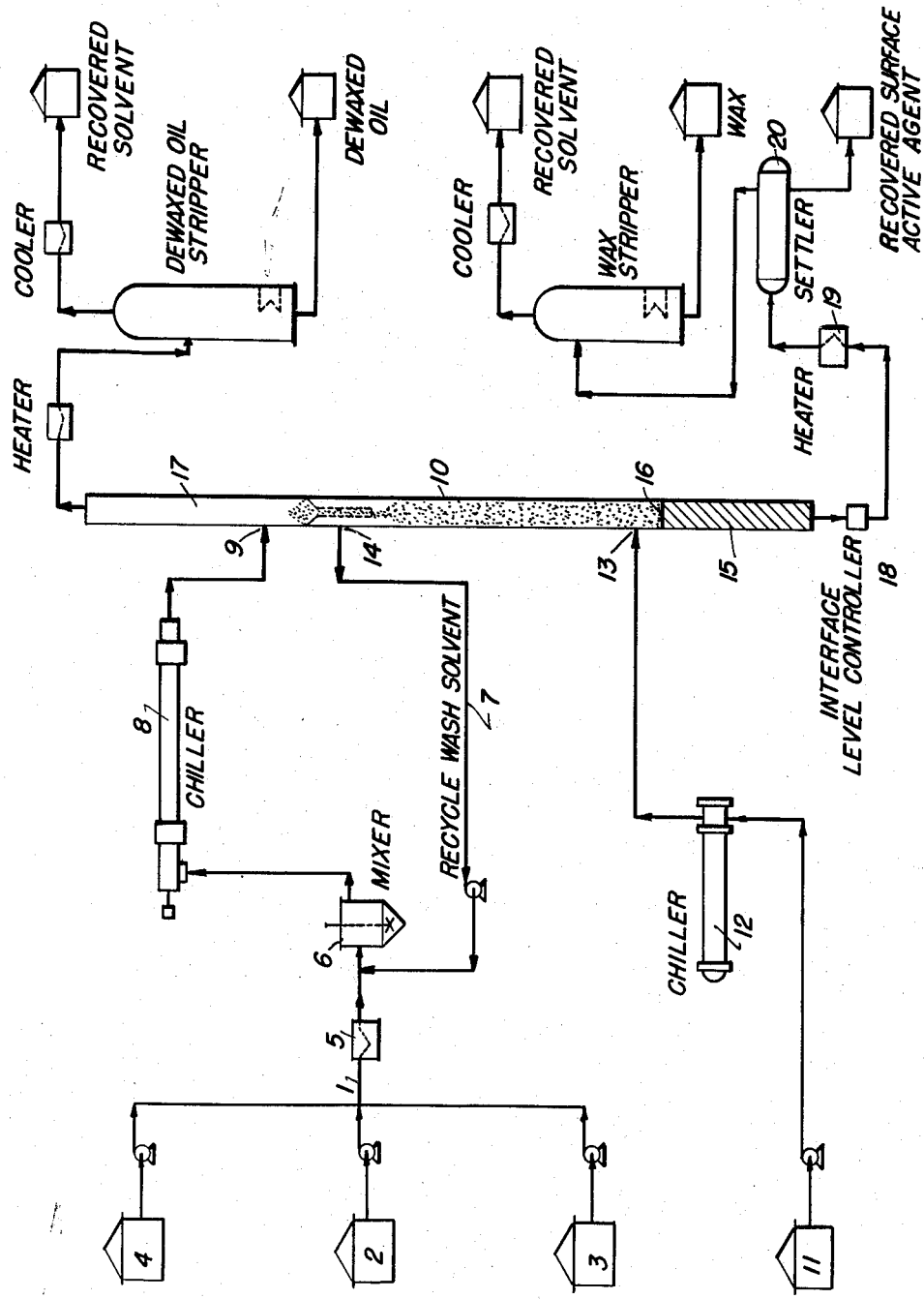

2,658,854

UNITED STATES PATENT OFFICE 2,658,854

GRAVITY DEWAXING OF WAX-BEARING HYDROCARBON FRACTIONS

Harold C. Myers and Arnold O. Pukkila, Woodbury, N. J., assignors to Socony-Vacuum Oil Company, Incorporated, a corporation of New York Application October 1, 1951, Serial No. 249,114

7 Claims. (Cl. 196—18)

This invention relates to the separation of wax from wax-oil mixtures or solutions of wax in oil, and is more particularly concerned with a process for dewaxing wax-containing hydrocarbon fractions. More specifically, the present invention provides a gravity method for separating wax or oil from wax-oil mixtures or from solutions of wax in oil.

As is well known to those familiar with the art, various methods of dewaxing wax-containing hydrocarbon fractions have been proposed and several of them are being utilized in the petroleum industry. These methods fall into three main categories which, for convenience, may be enumerated as follows:

1. Filter press dewaxing of low-viscosity wax-containing oils with or without dilution with a suitable diluent or solvent;

2. Centrifuge dewaxing of high-viscosity wax-containing oils diluted with a suitable diluent or solvent;

3. Solvent dewaxing of low- or high-viscosity wax-containing oils:
A. Employing filtration for separating wax and oil, and
B. Employing centrifugation for separating wax and oil.

Filter press dewaxing of low-viscosity, wax containing oils comprises chilling a wax-containing hydrocarbon fraction having a S. U. V. of about 75–80 seconds at 100° F. to a temperature slightly below that at which the dewaxed hydrocarbon fraction should flow and, thereafter, subjecting the thus chilled hydrocarbon fraction to a filter pressing operation to separate, from the hydrocarbon fraction, the crystalline wax which has precipitated during the chilling operation. Filter press dewaxing is frequently employed in conjunction with naphtha as a diluent for the stock to be dewaxed, especially when high wax-content stocks are being processed or when low oil-content waxes are desired. However, filter press dewaxing is not applicable to the treatment of heavy oils. This is due to the difficulty of filtering oil through the cake formed by the fine crystals of ceresin waxes present in these heavy oils.

Centrifuge dewaxing comprises passing continuously a chilled solution of residual oil in naphtha through a centrifuge revolving at about 17,000 R. P. M., separating the oil and wax streams and, subsequently, removing the solvent naphtha therefrom. Centrifuge dewaxing is generally applicable to the treatment of residual oils. This is due to the large crystal structure and the resulting poor flow characteristics of the paraffinic waxes present in low-viscosity oils. However, with suitable modifications, centrifuge dewaxing can be applied to the processing of distillate oils. Moreover, centrifuge dewaxing has the disadvantage of producing high oil-content waxes, and oils which, on standing, sometimes develop wax clouds due to ineffectual dewaxing of the wax-containing residual oil.

The availability of new solvents having given desired characteristics at moderate cost has led to the development of numerous types of solvent dewaxing processes. In general, in these processes, the wax-containing oil is mixed with prescribed amounts of a solvent or diluent and the mixture is chilled to a predetermined temperature. The chilled mixture is then subjected either to a filtering operation or to a centrifuging operation to separate, from the oil, the wax which has precipitated during the chilling operation. Finally, the solvent is stripped from the wax and from the dewaxed oil.

The benzol-ketone dewaxing process is typical of these solvent dewaxing processes and, probably, is the most extensively used in the petroleum industry for dewaxing both low- and high-viscosity wax-containing oils and for deoiling the waxes thus obtained in rerun processing. In this process, waxy oil or oily wax admixed with a solvent containing about 40 per cent methyl-ethyl ketone, 52 per cent benzol, and 8 per cent toluol, in a proportion of about 1:3, is chilled to the dewaxing or deoiling temperature by exchange with outgoing products and by refrigeration. Oily and waxy materials are separated by employing a rotary drum-type filter and each is subsequently stripped free of solvent. Dewaxing operations are carried out at temperatures of about minus 30° F. to about plus 20° F., while wax-deoiling operations are performed at temperatures as high as 100° F. Generally, dewaxing temperatures are about 20° F. lower than the pour point of the finished oil.

Another widely used solvent dewaxing process is the propane dewaxing process. Propane dewaxing differs from other solvent dewaxing processes in that a liquefied hydrocarbon is utilized in pressure equipment. Chilling to temperatures about 30–40° F. lower than the pour point of the finished oil is effected by self-evaporation of the propane combined, when desirable, with extraneous refrigeration. Filtration is performed with rotary or leaf-type pressure filters. The proportions of solvent to oil are similar to those employed in the benzol-ketone process and the dewaxing or deoiling temperatures vary from from about minus 40° F. to about plus 100° F.

Other solvent dewaxing methods, such as the Separator-Nobel and Beri-Sol dewaxing processes, utilize centrifuges for separating oil and wax from solvent-diluted wax-containing oils. The former process employs trichloroethylene as the solvent, while the latter utilizes a mixture of benzene with ethylene dichloride as the solvent. In general, the dewaxing or deoiling temperatures are about 20° F. lower than the desired pour point of the dewaxed oil. Solvent-to-oil ratios may be as high as 8:1.

More recently, new processes for dewaxing wax-containing mineral oils have been proposed. In general, in these processes, waxy oil is emulsified in various aqueous media (i. e., the aqueous phase is the continuous phase), the emulsion is then chilled, and, subsequently, oil is leached from the emulsion. Various oil solvents are utilized for effecting the leaching operation.

It is well known that there are numerous disadvantages associated with current methods of dewaxing wax-containing distillate stocks and residual oil stocks. These disadvantages may be classified into two main groups, i. e., those of an operating nature and those of an economic nature. Accordingly, any process which substantially eliminates the inherent technological difficulties and minimizes the operating costs of the processes of the prior art is manifestly highly desirable.

In accordance with copending application, Serial Number 107,318, filed by Myers, Pukkila and Petry on July 28, 1949, now U. S. Patent No. 2,645,597, it was found that it was possible to effect dewaxing of wax-containing distillate stocks and residual oil stocks in a more efficient, relatively simpler and more economical manner. As set forth therein, it was discovered that the foregoing could be achieved through the application of a procedure utilizing a mechanism whereby wax is removed from a dewaxed oil-solvent solution by gravity separation, wax being deoiled subsequently.

It is well known in the art that gravity separation of wax from dewaxed oil-solvent solutions occurs at very slow rates, even when utilizing high-gravity solvents. These rates are of such small magnitude as to preclude any commercial application of dewaxing procedures embodying this method of separation. The rates become especially poor, from the standpoint of commercial feasibility, when it is attempted to process distillate oil stocks containing large, interlocking paraffin wax crystals.

In the aforementioned copending application for patent filed by Myers, Pukkila and Petry, it was postulated that the slow rates referred to were attributable to both the crystal habit of waxes and the probable occlusion of dewaxed oil or oil-solvent solution therein, thereby preventing the wax crystals from settling in accordance with their true gravity. In accordance with this copending application, these difficulties were overcome through the conjoint use of specified types of surface active agents and of non-freezing aqueous solution. It was envisaged that the conjoint use of these materials accomplished the following:

1. Reduced appreciably the occlusion of dewaxed oil or oil-solvent mixture in the wax product;
2. Contributed to an increase in the difference between the effective specific gravity of the dewaxed oil or oil-solvent mixture and the effective specific gravity of the wax; and
3. Promoted the agglomeration of the wax crystals in the oil or oil-solvent mixture;

through the attachment of the non-freezing aqueous solution to the wax crystal surfaces, in the presence of oil or oil-solvent mixtures. The thus separated wax crystals could be washed with fresh solvent to remove residual oil or they could be washed with non-freezing aqueous solution to remove entrained oil thereby conserving wash solvent.

For the primary purpose of providing a more complete understanding of the scope of the invention described in the copending application, the mechanism whereby wax crystal surfaces were wetted by the non-freezing aqueous solution, in the presence of oil or of oil-solvent mixtures, stripped to its essentials, was postulated to be as follows: In general, a surface active agent is considered to be a compound, usually an organic compound, one extremity of a molecule of which is polar in nature, in this instance, hydrophilic or oil-repellent, while the other is non-polar in nature, in this case, hydrophobic or water-repellent. Since wax is essentially oily in character, it follows that with respect to the non-polar end of a molecule of a surface active agent, there will be competition between wax and oil or between wax and an oil-solvent mixture. Conceivably, a surface active agent can be chosen or prepared, a molecule of which possesses a non-polar end which is more avid for wax than for oil or for an oil-solvent mixture. Therefore, in a system consisting of a wax phase dispersed in an oil or an oil-solvent phase, the molecules of such a surface active agent will adsorb at the wax-oil or wax-oil-solvent mixture interfaces. This, in effect, means that the wax surfaces are coated, at least in part, with an oil-repellent film. Hence, when water or an aqueous solution is added to the system as a third phase, water or the aqueous solution becomes attached to the wax surfaces. The resulting system then will consist of wax particles at least partially covered with water or aqueous solution dispersed in a continuous oil or oil-solvent phase. The result is that the effective gravity of the wax particles is changed appreciably.

In normal gravity separation of wax from dewaxed oil-solvent solution, separation occurs by motion of the wax particles, with respect to the dewaxed oil or oil-solvent solution, induced by a difference between the specific gravities of the wax and of the dewaxed oil or oil-solvent solution. Other variables remaining constant, the rate of motion of the wax varies inversely as the viscosity of the dewaxed oil or oil-solvent solution and directly as the difference between the specific gravities and the slip coefficient between dewaxed oil or oil-solvent solution and wax. In normal gravity separation, the wax particles are in direct contact with dewaxed oil or oil-solvent solution and the great affinity of wax for oil or oil-solvent solution results in substantially zero slip at the interfaces therebetween. In accordance with the system described hereinbefore, the dewaxed oil or oil-solvent solution will be in contact, at least to some appreciable extent, with water. Since a large amount of slip is known to take place at oil-water interfaces, a reduction in resistance to motion inevitably follows. Hence, in addition to an increase in the rate of motion caused by an increased difference in specific gravity, the rate of motion is further increased by an increase in the slip coefficient.

In view of the foregoing, it follows, also, that since there is substantially no affinity between oil or oil-solvent and water or aqueous solution, any oil or soil-solvent solution which is separated with the wax product is only such material as is occluded therein. For this reason, it can be removed by washing with water or aqueous solution or solvent, thus permitting, theoretically at least, the production of oil-free waxes.

Accordingly, and broadly stated, the invention of the copending application provides a process for effecting dewaxing of wax-containing oils and/or deoiling of oil-containing waxes, collectively, wax-oil mixtures, which comprises adding an aqueous solution which is capable of remaining in substantially the liquid state at the dewaxing temperature, to a wax-oil mixture; treating the mixture thus obtained in the presence of a surface active agent to disperse the aqueous solution in the wax-oil mixture; cooling the dispersion to dewaxing temperature to produce a wax-aqueous solution phase; and separating the wax-aqueous solution phase.

It has now been discovered that it is possible to replace the water in the process set forth in the copending application referred to hereinbefore with other liquids. Indeed, it has been found that the amounts of these liquids required for successful operation are appreciably smaller in magnitude than those of water.

Therefore, it is a broad object of the present invention to provide a process for separating wax or oil from wax-oil mixtures or from solutions of wax in oil. Another object is to provide a gravity separation method for separating wax or oil from wax-oil mixtures or from solutions of wax in oil. A further object is to effect dewaxing of wax-containing distillate and residual oils which is efficient, economical, and relatively simple. A very important object is to afford an accelerated gravity separation process for effecting dewaxing and wax-deoiling of wax-containing oils and of oil-containing waxes, respectively.

Other objects and advantages of the present invention will become apparent to those skilled in the art from the following description taken in conjunction with the drawing showing a diagrammatic illustration of a plant for practicing the process of the present invention.

Broadly stated, the present invention provides a process for effecting dewaxing of wax-containing oils and/or deoiling of oil-containing waxes, collectively, wax-oil mixtures, which comprises adding a specified organic liquid to a wax-oil mixture; treating the mixture thus obtained in the presence of a surface active agent to disperse the organic liquid in the wax-oil mixture; cooling the dispersion to dewaxing temperature to produce a wax-organic liquid phase; and separating the wax-organic liquid phase.

Without any intent to limit the scope of the present invention, the mechanism involved in the operation of the process contemplated herein may be postulated to be similar in every respect to that postulated for the process set forth in the copending application except that the organic liquid replaces the water or aqueous solution. Indeed, the fact that only certain organic liquids, as set forth hereinafter, have been found to be operable herein, appears to be a confirmation of the mechanism postulated for the operation.

From the foregoing, it will become apparent to those skilled in the art that the process contemplated herein may be carried out in accordance with several procedures, all of which, nevertheless, are encompassed by the broad statement of invention set forth hereinbefore. By way of illustration, a preferred specific embodiment of the present invention may be practiced as follows: Referring to the drawing, a primary stream 1 consisting of a wax-oil mixture 2, a low specific gravity solvent 3, and an organic liquid solution 4 of a surface active agent is heated to a temperature of about 110° F. in a heater 5 and mixed in a mixer 6 in the presence of a recycle stream 7 of wash solvent from the deoiling operation of the process, to produce a dispersion of the organic liquid in the waxy oil-solvent solution. The dispersion is fed to a chiller 8, for example, a screw chiller, wherein it is cooled to the dewaxing temperature, normally 0° F. The effluent from the chiller 8 comprising precipitated wax attached to the dispersed organic liquid droplets is then fed to an inlet 9 into the upper section of a tower 10. The organic liquid droplets with the attached wax move downwardly from the inlet 9 through the tower 10 at a rate of 0.1 to 3.0 feet and higher per minute. Fresh solvent 11 is fed through another chiller 12 to an inlet 13 into the lower portion of the tower 10, whence it flows upwardly through the tower 10 and countercurrent to the downwardly moving organic liquid droplets with the attached wax, thereby washing the latter to reduce the oil-content of the wax. The wash solvent is removed from the tower 10 at the relatively constricted section thereof 14, just below the inlet 9, and is subsequently employed, as stated hereinbefore, as the recycle stream 7, for diluting the primary stream 1. The organic liquid droplets with the attached wax collect at the bottom of the tower 10 to produce a wax phase 15 which forms an interface 16 with the remainder of the contents of the tower 10. The dewaxed oil-solvent solution accumulates in the upper portion of the column 10, above the inlet 9. The interface 16 is kept, preferably, at a level below the inlet 13 and the rate of products take-off is maintained by an air-operated diaphragm-type level controller 18. The wax phase 15 is removed from the bottom of the tower 10, and is fed to a heater 19, wherein it is heated to a temperature of about 125° F. The effluent from the heater 19 is fed to a settler 20 to separate the wax from the organic liquid which may be recycled to the process. The wax product may be finished in a conventional manner. The dewaxed oil-solvent solution 17 is removed from the top of the tower 10 and the solvent and oil are separated and recovered in a conventional manner.

Obviously, when employing high specific gravity solvents, the wax phase will collect at the top of the tower. In this case, the wax phase will be removed from the top of the tower, the dewaxed oil-solvent will be removed from the bottom of the tower, and the wash solvent will be similarly drawn from an intermediate level for recycle to the primary stream for dilution purposes.

In general, any wax-containing oil or any oil-containing wax is amenable to the process of the present invention. The charge stock may be either a distillate stock or a residual stock or oily waxes obtained therefrom. Wax-bearing mineral oils, brown coal tar oils, animal oils, shale oils, vegetable oils and synthetically produced oils, any of which may have been previously subjected to a deasphalting treatment or other treatment for the purpose of improving their physical and/or their chemical nature may be mentioned by way of non-limiting examples of materials suitable as charge stocks for the process contemplated herein. There appears to be nothing critical in the amount of wax present in the wax-containing oils or in the amounts of oil present in the oil-containing waxes to be treated. Thus, the wax-content of the charge stocks may vary between about 0.1 per cent and about 99.9 per cent by weight. On the other hand, the amount of wax present in either of the mixtures is largely determinative of the fluidity of the charge to the process.

Accordingly, in practicing the invention, it is usually desirable, although not essential, to increase the fluidity of the charge to the process by the addition of an oil-miscible diluent or solvent. For this purpose, the oil-solvents of the prior art may be used. It has been found that a suitable diluent, in general, should possess the following properties. It should be substantially completely miscible with the stock to be treated, it should be substantially insoluble in and immiscible with the organic liquid referred to hereinbefore, it should possess, preferably, a low viscosity coefficient, it should not manifest any substantial tendency to emulsify under the conditions of the process, it should be a poor solvent for solid wax at the dewaxing temperature, it must not disturb the adsorption of the molecules of the surface active agent at the solid wax surfaces, it must not affect, to any appreciable extent, the tendency of the surface active agent to adsorb at the solid wax surfaces, and, finally, it should not displace the organic liquid from the organic liquid-coated wax surfaces. Hydrocarbons such as propane, butane, pentane, propene, butenes, pentenes, naphtha, gasoline, benzene and kerosene, and trichloroethylene, methylethyl ketone, ethylene dichloride, methyl chloride, carbon tetrachloride, acetone, and mixtures thereof such as methylethyl ketone-benzene mixtures, acetonitrile-benzene mixtures, ethyl carbonate-propane mixtures, may be mentioned by way of non-limiting examples of diluents or solvents suitable for the purposes of the present invention.

There appears to be nothing critical in the amounts of diluent or solvent used. As stated hereinbefore, the primary purpose of the diluent is to increase the fluidity of the charge to the process. Accordingly, the amounts of solvent used may vary between wide limits. Ordinarily, amounts to produce between about 0.5:1 and about 20:1, preferably between about 2:1 and about 4:1 (volume of solvent to volume of charge stock), dilution are employed. The solvent may be added to the oil at any time during the process and may be added in fractions of the total amount to be used over a period of time prior to the final separation step. In practice, the solvent is added usually prior to or during the chilling step.

Generally speaking, the surface active agents utilizable herein are the alkali metal alkyl aromatic and hydroxyaromatic hydrocarbon sulfonates, such as sodium wax-benzene sulfonate, sodium wax-phenol sulfonate, sodium wax-$\beta$-naphthol sulfonate, and potassium wax-naphthalene sulfonate.

Materials known as sodium wax-phenol sulfonate, for example, may be prepared, as is well known in the art, in accordance with the following procedure (U. S. Patent to Reiff et al., No. 2,252,666): A paraffin wax melting at about 120° F. and predominately comprised of hydrocarbon compounds having at least 20 carbon atoms per molecule is chlorinated by heating to about 200° F. and bubbling chlorine therethrough until the chlorwax obtained contains from about 10 per cent to about 21 per cent by weight of chlorine. The chlorwax is then condensed with phenol, at a temperature of about 350° F. and in the presence of about 4 per cent to about 10 per cent by weight of an aluminum chloride Friedel-Crafts catalyst, to produce wax-substituted phenol. This product is treated with chlorsulfonic acid in amounts, on a weight basis, of about 100-175 per cent of theoretical, in a conventional sulfonation operation, at a temperature of about 125-200° F., and the product thus obtained is neutralized with sodium hydroxide in amounts, on a weight basis, of about 120-150 per cent of theoretical, at a temperature of about 150° F.

In general, the structure of the materials known as metal wax-phenol sulfonates is visualized to be as follows:

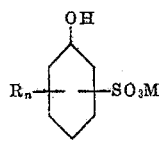

wherein R may be wax or other hydrocarbon radical of comparable chain length, M is the hydrogen equivalent of a metal, and $n$ is 1 to 3. The wax groups may be derived from a fraction of a viscous mineral oil ranging in molecular weight from that of a light wax distillate to a heavy residuum.

Materials known as sodium wax-phenol (1–14) sulfonate are a good example of a surface active agent useful in the process of the present invention. With respect to the connotation (1–14), the first number indicates the theoretical degree of alkylation, i. e., the atomic proportions of chlorine in the chlorwax which is reacted with one mol of the hydroxy aromatic compound, and the second number indicates the weight per cent of chlorine in the chlorwax. The sodium wax-phenol (1–14) sulfonate actually is a mixture of the mono-wax-phenol sulfonate, the diwax-phenol sulfonate, and of some poly-wax-phenol sulfonates.

The amounts of surface active agent to be used may vary between wide limits. Ordinarily, excessive amounts are to be avoided since it has been found that they effect emulsification of the oil or oil-solvent mixture in the organic liquid, i. e., the organic liquid is the continuous phase. On the other hand, the use of insufficient amounts will result in an incomplete separation of the wax. In general, the amounts of surface active agent to be used depend upon the amount of wax present in the stock undergoing treatment. Obviously, the optimum amounts to be utilized in any given instance can be readily determined by those skilled in the art by a few preliminary tests. In practicing the invention, it has been found that amounts varying between about 0.01 per cent and about 10 per cent, preferably, between about 0.3 per cent and about 3 per cent, based on the weight of the wax-containing oil or oil-containing wax in the charge will produce satisfactory results.

The surface active agent is ordinarily added to the charge as a solution in the organic liquid. In conformance with the mechanism of operation postulated hereinbefore, the organic liquid is an essential factor in the successful operation of the process of the present invention, the wax surfaces becoming at least partially covered with the organic liquid. The organic liquids utilizable herein are the polyhydroxy alcohols which are capable of remaining in substantially the liquid state at the dewaxing temperature, such as glycerol (1,2,3-propanetriol), glycol (1,2-ethanediol), and trimethylene glycol (1,3-propanediol). Monohydroxy alcohols and ethers are not operable. These polyhydroxy alcohols must (1) be substantially liquid at dewaxing temperatures, (2) be substantially insoluble in oil or wax, (3) be substantially insoluble in dewaxing solvent, (4) possess high solvent power for the surface active agent, and (5) be chemically inert and stable.

The amounts to be used depend upon the amount of wax present in the stock undergoing treatment. Obviously, the optimum amounts of polyhydroxy alcohol to be utilized in any given instance can be readily determined by those skilled in the art by a few preliminary tests. In practice, it has been found that amounts varying between about 1 per cent and about 200 per cent, preferably between about 25 per cent and about 75 per cent, based on the weight of the wax-containing oil or oil-containing wax in the charge will produce satisfactory results.

Agitation is necessary to effect dispersion of the organic liquid in the wax-bearing oil and to ensure collision between the dispersed organic liquid droplets and wax particles during and after chilling. In general, more violent agitation is desirable when processing distillate stocks.

In order to facilitate the dispersion of the organic liquid in the wax-oil mixture during the initial stages of the process and, also, to ensure that the wax-oil mixture or wax-oil-solvent mixture constitutes a homogeneous liquid phase at the beginning of the treatment, it is ordinarily preferred to heat the mixture to temperatures varying between about 100° F. and about 200° F. during the dispersion operation. The temperature to be utilized to produce optimum results will depend upon the nature of the stock undergoing treatment.

The dewaxing temperatures applicable in the process are those of the prior art, i. e., between about −40° F. and about 100° F. It must be recognized, of course, that the dewaxing temperature applicable in any particular instance will depend upon the nature of the system, i. e., the surface active agent utilized, the type of organic liquid, the type of dewaxing solvent, etc.

The rate at which the temperature of the mixture is lowered to dewaxing temperature (the chilling rate) is not a critical factor, although, as it will be appreciated by those skilled in the art, an important factor. The chilling rate, as is well known, is determinative of the size of the wax crystals that precipitate out during the chilling operation. For general purposes, it has been found that an average chilling rate of about 10° F. per hour to about 500° F. per hour is conducive to optimum results. In general, the higher chilling rates are preferred when processing distillate stocks while the lower chilling rates are employed, preferably, when treating residual stocks.

Although the foregoing discussion has indicated a preferred sequence of the addition of the various components to the system and of the manipulations involved in the process, it must be clearly understood that departures from them may be made. For example, the wax-oil mixtures, the oil solvent, and the organic liquid solution of surface active agent, may be separately chilled and then mixed at any temperature down to the dewaxing temperature. Finally, instead of a tower, tanks, filters, centrifuges, and the like can be used to effect the separation of the organic liquid-wetted wax particles or crystals from the oil or oil-solvent mixtures. It will be apparent also that the process may be operated as a batch or discontinuous process or as a continuous process. Moreover, in many cases, it will be found to be advantageous to carry out the operation in stages. For example, the dewaxing may be effected at decreasingly lower dewaxing temperatures, down to the final dewaxing temperature, the operation contemplated herein being carried out in each stage with the "dewaxed" product of each stage constituting the charge stock for the subsequent stage.

The following examples are for the purpose of illustrating modes of carrying out the process of the present invention and to point out the advantages thereof, it being understood that the invention is not to be considered as being limited to the specific stocks, surface active agents, oil solvents and organic liquids or to the manipulations, apparatus, and conditions set forth therein. As it will be apparent to those skilled in the art, a wide variety of stocks, surface active agents, oil solvents and organic liquids and a diversity of apparatus, manipulations and conditions, as described hereinbefore, may be employed to carry out the dewaxing or deoiling operation.

EXAMPLES 1 THROUGH 5

In each of the following runs, a mixture of waxy stock diluted with a dewaxing solvent (40% methyl ethyl ketone, 50% benzol and 10% toluol) and an ethylene glycol solution of sodium wax-phenol (1–14) sulfonate was heated to reflux temperature (168° F.). The mixture thus obtained was chilled to a temperature of 0° F. (dewaxing temperature) while under agitation. The chilled mixture was then placed in a cylinder and the oil-solvent mixture was permitted to separate from the wax-phase. The oil-solvent mixture was decanted from the wax-phase and the latter was contacted three times with dewaxing solvent at a temperature of 0° F. For convenience, the pertinent data and the results obtained in each run are set forth in the following table:

Table

| Example No. | 1 | 2 | 3 | 4 | 5 |
|---|---|---|---|---|---|
| Stock | | | | | |
| Charge, vol.: | (1) | (1) | (1) | (2) | (3) |
| Stock | 1 | 1 | 1 | 1 | |
| Solvent | 3.5 | 3.5 | 3.5 | 3.0 | 3.5 |
| Ethylene glycol | 0.42 | 0.50 | 0.63 | 0.43 | 0.66 |
| Surface-active agent, percent wt.[4] | 3.0 | 3.0 | 3.0 | 2.5 | 2.5 |
| Dewaxing operation: | | | | | |
| Temperature, °F | 0 | 0 | 0 | 0 | 0 |
| Percent vol. settled in 1 min | 2.8 | 14.0 | 27.5 | 80.7 | 14.5 |
| Dewaxed oil, pour point, °F | 45 | 45 | 20 | 45 | 30 |
| Deoiling operation: | | | | | |
| No. of stages | 3 | 3 | 3 | 3 | 3 |
| Solvent:oil vol. ratio | 1.5:1 | 3.5:1 | 3.5:1 | 1.5:1 | 3.5:1 |
| Wax, before deoiling: | | | | | |
| Oil content, percent wt | 31.5 | 29.8 | 16.4 | 49.8 | 40.4 |
| Melting point, °F | 115.8 | 123.0 | 126.0 | 114.0 | 114.0 |
| Wax after deoiling: | | | | | |
| Oil content, percent wt | 9.2 | 5.1 | 4.3 | 2.1 | 5.4 |
| Melting point, °F | 124.2 | 128.0 | 128.0 | 135.0 | 160.0 |

[1] 30% oil content ketone slack wax.
[2] Furfural-refined distillate.
[3] Duo-sol refined bright stock.
[4] Based on stock.

It will be apparent from the foregoing that the present invention provides an efficient, economical, and relatively simple process for effecting gravity separation of wax or oil from wax-oil mixtures. It will be appreciated by those skilled in the art that the present invention may be embodied in other specific forms without departing from the spirit or essential attributes thereof. Accordingly, it must be clearly understood that the present embodiments be considered in all respects illustrative and not restrictive, reference being had to the appended claims rather than to the foregoing description to indicate the scope of the invention.

What is claimed is:

1. A process for separating wax and oil from a wax-oil mixture, which comprises adding a polyhydroxy alcohol selected from the group consisting of diols and triols of lower aliphatic hydrocarbons, which is capable of remaining in substantially the liquid state at the dewaxing temperature, is substantially soluble in oil and wax, possesses high solvent power for the surface active agent set forth hereinafter, and is chemically stable and inert under the conditions of operation, to said wax-oil mixture, in an amount varying between about one per cent and about 200 per cent based on the weight of the wax-oil mixture, to produce a polyhydroxy alcohol-wax-oil mixture; agitating said polyhydroxy alcohol-wax-oil mixture in the presence of a surface active agent selected from the group consisting of alkali metal alkyl aromatic hydrocarbon sulfonates and alkali metal alkyl hydroxy aromatic hydrocarbon sulfonates, in amounts of at least about 0.1 per cent based on the weight of the wax-oil mixture but less than the amount necessary to cause emulsification of the wax-oil mixture in the polyhydroxy alcohol, to produce a dispersion of the polyhydroxy alcohol in the wax-oil mixture in which the polyhydroxy alcohol is the dispersed phase; cooling said dispersion to the dewaxing temperature to associate wax with said dispersed phase thereby producing a dispersed wax-polyhydroxy alcohol phase; and separating said dispersed wax-polyhydroxy alcohol phase from said dispersion.

2. A process for separating wax and oil from a wax-oil mixture, which comprises heating said wax-oil mixture to a temperature sufficient to produce a substantially homogeneous liquid phase; adding a polyhydroxy alcohol selected from the group consisting of diols and triols of lower aliphatic hydrocarbons, which is capable of remaining in substantially the liquid state at the dewaxing temperature, is substantially soluble in oil and wax, possesses high solvent power for the surface active agent set forth hereinafter, and is chemically stable and inert under the conditions of operation, to said wax-oil mixture, in an amount varying between about one per cent and about 200 per cent based on the weight of the wax-oil mixture, to produce a polyhydroxy alcohol wax-oil mixture; agitating said polyhydroxy alcohol-wax-oil mixture in the presence of a surface active agent selected from the group consisting of alkali metal alkyl aromatic hydrocarbon sulfonates and alkali metal alkyl hydroxy aromatic hydrocarbon sulfonates, in amounts of at least about 0.01 per cent based on the weight of the wax-oil mixture but less than the amount necessary to cause emulsification of the wax-oil mixture in the polyhydroxy alcohol, to produce a dispersion of the polyhydroxy alcohol in the wax-oil mixture in which the polyhydroxy alcohol is the dispersed phase; cooling said dispersion to the dewaxing temperature to associate wax with said dispersed phase thereby producing a dispersed wax-polyhydroxy alcohol phase; and separating said dispersed wax-polyhydroxy alcohol phase from said dispersion.

3. A process for separating wax and oil from a wax-oil mixture, which comprises adding a solvent to said wax-oil mixture to produce a solvent-wax-oil mixture; adding a polyhydroxy alcohol selected from the group consisting of diols and triols of lower aliphatic hydrocarbons, which is capable of remaining in substantially the liquid state at the dewaxing temperature, is substantially soluble in oil, wax and solvent, possesses high solvent power for the surface active agent set forth hereinafter, and is chemically stable and inert under the conditions of operation, to said solvent-wax-oil mixture, in an amount varying between about one per cent and about 200 per cent based on the weight of the wax-oil mixture, to produce a polyhydroxy alcohol-solvent-wax-oil mixture; agitating said polyhydroxy alcohol-solvent-wax-oil mixture in the presence of a surface active agent selected from the group consisting of alkali metal alkyl aromatic hydrocarbon sulfonates and alkali metal alkyl hydroxy aromatic hydrocarbon sulfonates, in amounts of at least about 0.01 per cent based on the weight of the wax-oil mixture but less than the amount necessary to cause emulsification of the solvent-wax-oil mixture in the polyhydroxy alcohol, to produce a dispersion of the polyhydroxy alcohol in the solvent-wax-oil mixture in which the polyhydroxy alcohol is the dispersed phase; cooling said dispersion to the dewaxing temperature to associate wax with said dispersed phase thereby producing a dispersed wax-polyhydroxy alcohol phase; and separating said dispersed wax-polyhydroxy alcohol phase from said dispersion.

4. A process for separating wax and oil from a wax-oil mixture, which comprises adding a polyhydroxy alcohol selected from the group consisting of diols and triols of lower aliphatic hydrocarbons, which is capable of remaining in substantially the liquid state at the dewaxing temperature, is substantially soluble in oil and wax, possesses high solvent power for the surface active agent set forth hereinafter, and is chemically stable and inert under the conditions of operation, to said wax-oil mixture, in an amount varying between about 25 per cent and about 75 per cent based on the weight of the wax-oil mixture, to produce a polyhydroxy alcohol-wax-oil mixture; agitating said polyhydroxy alcohol-wax-oil mixture in the presence of a surface active agent selected from the group consisting of alkali metal alkyl aromatic hydrocarbon sulfonates and alkali metal alkyl hydroxy aromatic hydrocarbon sulfonates, in amounts varying between about 0.01 per cent and about 10 per cent based on the weight of the wax-oil mixture, to produce a dispersion of the polyhydroxy alcohol in the wax-oil mixture in which the polyhydroxy alcohol is the dispersed phase; cooling said dispersion to the dewaxing temperature to associate wax with said dispersed phase thereby producing a dispersed wax-polyhydroxy alcohol phase; and separating said dispersed wax-polyhydroxy alcohol phase from said dispersion.

5. A process for separating wax and oil from a wax-oil mixture, which comprises adding a solvent to said wax-oil mixture in an amount to produce a solvent-wax-oil mixture in which the solvent to wax-oil mixture volume ratio varies between about 0.5:1 and about 20:1; adding a polyhydroxy alcohol selected from the group consisting of diols and triols of lower aliphatic hydrocarbons, which is capable of remaining in substantially the liquid state at the dewaxing temperature, is substantially soluble in oil, wax and solvent, possesses high solvent power for the surface active agent set forth hereinafter, and is chemically stable and inert under the conditions of operation, to said solvent-wax-oil mixture, in an amount varying between about 25 per cent and about 75 per cent based on the weight of the wax-oil mixture, to produce a polyhydroxy alcohol-solvent-wax-oil mixture; agitating said polyhydroxy alcohol-solvent-wax-oil mixture in the presence of a surface active agent selected from the group consisting of alkali metal alkyl aromatic hydrocarbon sulfonates and alkali metal alkyl hydroxy aromatic hydrocarbon sulfonates, in amounts varying between about 0.01 per cent and about 10 per cent based on the weight of the wax-oil mixture, to produce a dispersion of the polyhydroxy alcohol in the solvent-wax-oil mixture in which the polyhydroxy alcohol is the dispersed phase; cooling said dispersion to the dewaxing temperature to associate wax with said dispersed phase thereby producing a dispersed wax-polyhydroxy alcohol phase; and separating said dispersed wax-polyhydroxy alcohol phase from said dispersion.

6. A process for separating wax and oil from a wax-oil mixture, which comprises adding ethylene glycol to said wax-oil mixture, in an amount varying between about 25 per cent and about 75 per cent based on the weight of the wax-oil mixture, to produce an ethylene glycol-wax-oil mixture; agitating said ethylene glycol-wax-oil mixture in the presence of sodium wax-phenol (1-14) sulfonate, in amounts varying between about 0.3 per cent and about 3 per cent based on the weight of the wax-oil mixture, to produce a dispersion of the ethylene glycol in the wax-oil mixture in which the ethylene glycol is the dispersed phase; cooling said dispersion to the dewaxing temperature to associate wax with said dispersed phase thereby producing a dispersed wax-ethylene glycol phase; and separating said dispersed wax-ethylene glycol phase from said dispersion.

7. A process for separating wax and oil from a wax-oil mixture, which comprises adding a solvent to said wax-oil mixture in an amount to produce a solvent-wax-oil mixture in which the solvent to wax-oil mixture volume ratio varies between about 2:1 and about 4:1; adding ethylene glycol to said solvent-wax-oil mixture, in an amount varying between about 25 per cent and about 75 per cent based on the weight of the wax-oil mixture, to produce an ethylene glycol-solvent-wax-oil mixture; agitating said ethylene glycol-solvent-wax-oil mixture in the presence of sodium wax-phenol (1-14) sulfonate, in amounts varying between about 0.3 per cent and about 3 per cent based on the weight of the wax-oil mixture, to produce a dispersion of the ethylene glycol in the solvent-wax-oil mixture in which the ethylene glycol is the dispersed phase; cooling said dispersion to the dewaxing temperature to associate wax with said dispersed phase thereby producing a dispersed wax-ethylene glycol phase; and separating said dispersed wax-ethylene glycol phase from said dispersion.

HAROLD C. MYERS.
ARNOLD O. PUKKILA.

References Cited in the file of this patent

UNITED STATES PATENTS

| Number | Name | Date |
|---|---|---|
| 2,164,013 | Jenkins | June 27, 1939 |
| 2,205,096 | Jenkins | June 18, 1940 |
| 2,263,535 | Carr et al. | Nov. 18, 1941 |